United States Patent [19]

Vasishth et al.

[11] 4,122,144
[45] Oct. 24, 1978

[54] PRODUCTION OF RIGID SHAPED ARTICLES USING PHENOL-FORMALDEHYDE RESINS

[75] Inventors: Ramesh C. Vasishth, Delta; Pitchaiya Chandramouli, Richmond, both of Canada

[73] Assignee: Cor Tech Research Ltd., Richmond, Canada

[21] Appl. No.: 811,782

[22] Filed: Jun. 30, 1977

Related U.S. Application Data

[60] Division of Ser. No. 567,864, Apr. 14, 1975, Pat. No. 4,045,411, which is a continuation-in-part of Ser. No. 421,068, Dec. 9, 1973, abandoned.

[30] Foreign Application Priority Data

Apr. 17, 1974 [GB] United Kingdom ............... 16860/74

[51] Int. Cl.$^2$ .......................... B29C 27/00; C09J 5/04
[52] U.S. Cl. ..................................... 264/123; 156/242; 156/335; 260/17.2; 264/109; 264/113; 264/122; 264/134

[58] Field of Search ................ 156/242, 335; 260/172; 264/123, 134

[56] References Cited

U.S. PATENT DOCUMENTS

| 3,485,797 | 12/1969 | Robins | 260/57 |
| 3,501,552 | 3/1970 | Robins | 260/52 X |
| 3,535,185 | 10/1970 | Tveten | 260/57 A |
| 3,690,979 | 9/1972 | Jarvi | 156/335 |

FOREIGN PATENT DOCUMENTS 927,041 5/1973 Canada.

*Primary Examiner*—Edward M. Woodberry
*Attorney, Agent, or Firm*—Sim & McBurney

[57] ABSTRACT

Rigid shaped articles are formed by providing a novel thermosetting phenol-formaldehyde resin having a characteristic structure and infra-red spectrum as a coating over the surfaces of a plurality of individual elements, forming the coated elements into a shape and thermosetting the resin of the coating.

12 Claims, 10 Drawing Figures

PRODUCTION OF RIGID SHAPED ARTICLES USING PHENOL-FORMALDEHYDE RESINS

REFERENCE TO RELATED APPLICATION

This application is a division of application Ser. No. 567,864 filed Apr. 14, 1975 (now U.S. Pat. No. 4,045,411), which, in turn is a continuation-in-part of our copending application Ser. No. 421,068 filed Dec. 9, 1973 (now abandoned).

FIELD OF INVENTION

The present invention is directed to the production of rigid shaped articles.

BACKGROUND TO THE INVENTION

In Canadian Pat. No. 927,041 there is described the preparation of phenol-formaldehyde resins from mole ratios of formaldehyde to phenol greater than 1:1 by a two-step procedure in an aqueous reaction medium containing a metal carboxylate catalyst therefor. In the first exothermic step, the reaction mixture is maintained at a temperature of about 60° to about 80° C., and in the second step a temperature of 90° to 100° C. is used, typically about 90° C. While the procedure outlined in this prior art is said to be applicable to a wide range of mole ratios of formaldehyde to phenol of from 1:1 to 3:1, the specific example thereof is limited to a mole ratio of 1.5:1.

The resins produced by the two-step procedure of this prior art typically have a low viscosity at room temperature and are unsuitable for many adhesive applications, such as rice husk board manufacture. By prolonging the cooking procedure of the second stage of the resin-forming process, it is possible to provide a resin of high viscosity at room temperature (greater than about 50,000 cps at 75° F.) which is suitable for rice husk board manufacture, as described in more detail in our U.S. Pat. No. 3,850,677.

The high viscosity resins provided by this modification of the procedure of Canadian Pat. No. 927,041 require heating to decrease their viscosity for application to the substrate. Acids typically are used to accelerate the rate of cure of the resins. However, the resins cure rapidly in the presence of acid at the elevated temperatures required for application to the substrate, leading to separate application of resin and acid to the substrate.

This mode of application is haphazard at best since proper contact of acid and resin on the substrate surface is by no means assured, and this leads to the use of greater quantities of acid than otherwise would be required, resulting in uneconomic chemical use and often impaired product appearance.

In Canadian Pat. No. 927,041, the resin produced by the procedure described therein is described as containing a preponderance of benzyl ether linkages between phenolic rings, mainly at ortho positions relative to the phenolic hydroxyl group and exhibiting a characteristic infra-red spectrum exhibiting large absorption at wave numbers of 1230 cm$^{-1}$, 1050 cm$^{-1}$ (1060 cm$^{-1}$) and 1010 cm$^{-1}$, and are reported to possess very long shelf lives at room temperature.

A further prior art patent, U.S. Pat. No. 3,485,797, describes the preparation of phenol-formaldehyde resins by a procedure involving anhydrous conditions using para-formaldehyde and phenol and water-immiscible solvents such as toluene to remove the water of condensation. This procedure uses relatively expensive catalysts.

In both pieces of prior art, the addition of acid to the resin is described for the purpose of accelerating cure of the resin.

SUMMARY OF INVENTION

In accordance with the present invention, there is provided a method of forming a rigid shaped article which comprises forming a thermosetting phenol-formaldehyde resin having benzyl ether linkages ortho to the phenolic hydroxyl group and an infra-red spectrum which displays a large absorption at wave numbers of 1230 cm$^{-1}$, 1060 cm$^{-1}$ and 1010 cm$^{-1}$ by reacting formaldehyde with phenol at a mole ratio of at least about 1:1 in an aqueous reaction medium containing a metal carboxylate catalyst therefor, reacting said resin with at least one strong acid to cause a decrease of at least 35% in the ratio of absorbance at 1010 cm$^{-1}$, measured from a base line drawn between wave numbers of 1030 cm$^{-1}$ and 950 cm$^{-1}$, to that at 1230 cm$^{-1}$, measured from a base line drawn between wave numbers of 1130 cm$^{-1}$ and 1310 cm$^{-1}$, to a value less than about 0.1 while leaving substantially unaffected the absorption at wave numbers of 1230 cm$^{-1}$ and 1060 cm$^{-1}$, providing the resin resulting from said reaction with acid as a coating over at least part of the surface of each member of a plurality of individual elements, forming said coated plurality of elements into a shape and thermosetting the resin of said coating to provide said rigid shaped article.

GENERAL DESCRIPTION OF INVENTION

The thermosetting phenol-formaldehyde resins provided on the surface of the plurality of elements may be formed by the controlled addition of acid to a high viscosity phenol-formaldehyde resin formed by the procedure disclosed in Canadian Pat. No. 927,041, typically at a mole ratio of formaldehyde to phenol of about 1.5 to 1.6:1.

When the acid is added to the resin at room temperature, a chemical reaction occurs which leads to an entirely new resin, as evidenced by its characteristic infrared spectrum, which may be isolated and is stable at room temperature. The latter resin is rapidly curable to a thermoset state by the use of heat and/or additional quantities of acid, preferably under pressure. The cure times required for the resins provided in this manner from those of Canadian Pat. No. 927,041 are much shorter than the corresponding resins of Canadian Pat. No. 927,041 and the cure times may be decreased further by addition of catalyzing quantities of acid to the novel resin prior to curing.

A wide range of organic and inorganic acids may be employed and include aryl sulfonic acids, such as benzene sulfonic acid and toluene sulfonic acid and inorganic acids such as phosphoric acid, sulfuric acid, together with mixtures of two or more of such acids. A wide range of acid quantities may be employed, depending on the strength of the acid and the temperature employed, for example, for toluene sulfonic acid, the quantity of acid may vary from about 0.25 to about 1.5%, preferably about 0.5 to about 1% by weight of the resin at room temperature.

The changes which occur upon addition of acid to a high viscosity phenol-formaldehyde resin prepared in accordance with the procedure of Canadian Pat. No. 927,041 is illustrated by the following observations. To a high viscosity resin made according to the procedure of Canadian Pat. No. 927,041 from 1 mole of phenol and 1.6 moles of formaldehyde was added 1% by weight of the resin of para-toluene sulfonic acid used as a 50% aqueous solution thereof. The mixture was maintained at a room temperature of about 70° F. and samples were withdrawn 5 minutes and 2¼ hours after acid addition and their infra-red spectra obtained. The three spectra obtained are shown in FIG. 1.

Figure 1A:
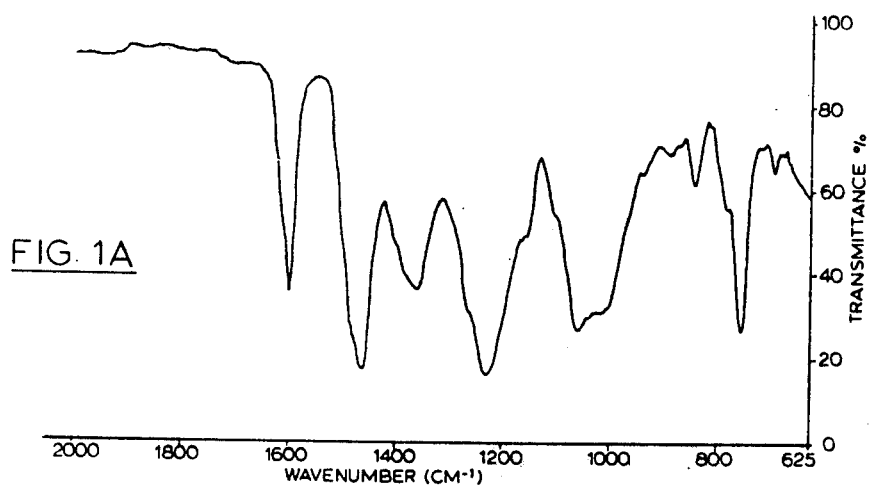
FIGS. 1A, 1B and 1C show infra-red spectra of changes in absorption with time upon addition of acid to phenol-formaldehyde resin containing benzyl ether linkages ortho to the phenolic hydroxyl group and prepared in accordance with Canadian Pat. No. 927,041.
Figure 1B:
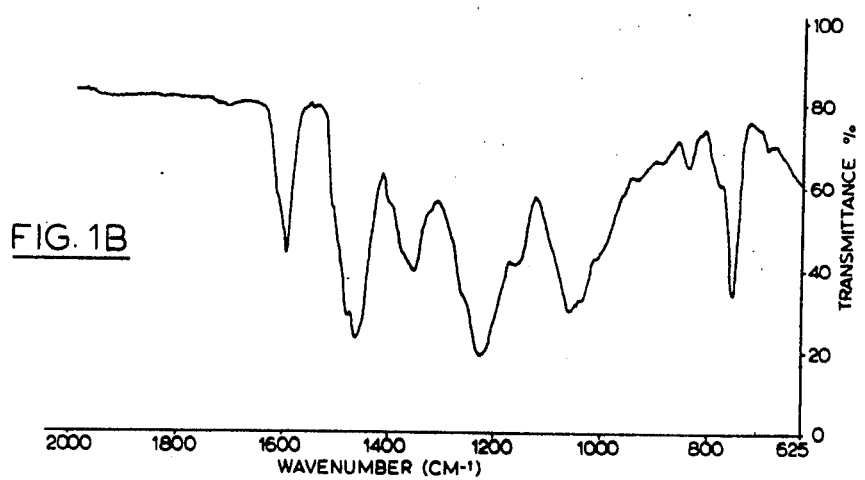
Figure 1C:
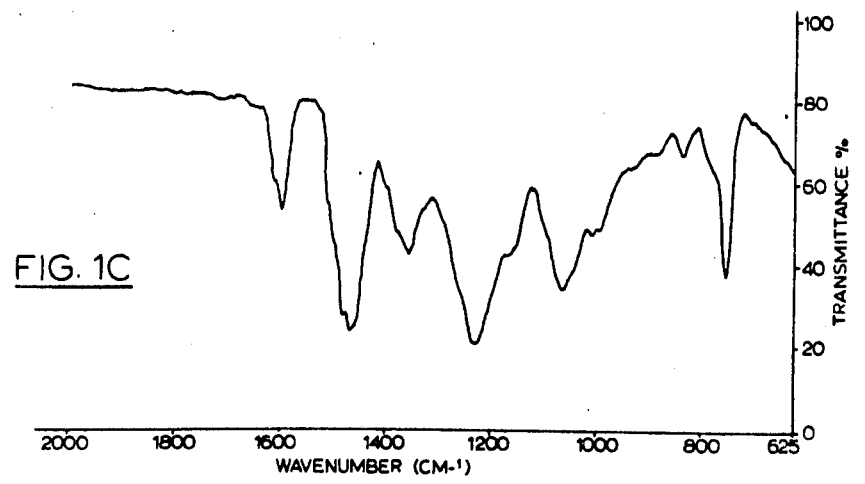

A study of infra-red spectra of FIG. 1 shows that the initially-formed high viscosity resin exhibits large absorption peaks at about 1010 cm$^{-1}$, 1060 cm$^{-1}$ and 1230 cm$^{-1}$ and, upon addition of acid, that there is an almost instant decrease in the absorbance at 1010 cm$^{-1}$. It was observed that this is accompanied by some formaldehyde evolution. This instant decrease in the absorbance value at 1010 cm$^{-1}$ may be attributed to either the cross-linking of any residual terminal methylol groups or to the breakdown of hemi-formal side chains. Since methylol groups are not likely to react instantly on addition of such small quantities of acid as 0.5 to 1% para-toluene sulfonic acid at room temperature, the sudden decrease of absorbance at 1010 cm$^{-1}$ must be attributed to some reaction other than methylol condensation.

The resins prior to acid addition, therefore, most likely have benzyl ether linkages ortho to the phenolic hydroxyl group and benzyl hemi-formal chains as indicated by the following formula:

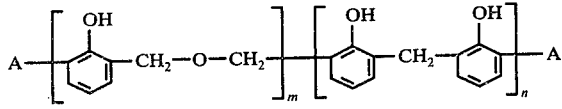

wherein $m$ and $n$ are numbers the sum of which is at least two and the ratio of $m$ to $n$ is greater than one and A is —CH$_2$—[O CH$_2$]—OH, —CH$_2$OH or hydrogen, where $x$ is an integer, at least some of the A groups being —CH$_2$—[OCH$_2$]$_x$—OH.

On the addition of acid to such resins, the hemi-formal end groups will yield a methylol group, simultaneously releasing the formaldehyde tied up in the side chain, thereby accounting for the observation of the release of formaldehyde upon addition of the acid.

It is possible that some of the end groups -A are simple methylols and others are benzyl hemi-formals. On acid addition at room temperatures in concentrations as low as 0.5% of toluene sulfonic acid of the weight of the resin, the immediate primary reaction, however, would involve the breakdown of the hemi-formals, with formaldehyde release.

Since formaldehyde is released upon acid addition and in view of the lower pH conditions prevailing, other side reactions in all likelihood take place. Thus, at least some of the formaldehyde released probably reacts into the resin structure or reacts with any free phenol present. The IR spectra in FIG. 1 also show that there is a decrease in the absorbance at 690 cm$^{-1}$ upon addition of acid indicating a decrease in the concentration of free phenol present in the resin. Probably there is also a decrease in the concentration of other monomeric methylol phenols present.

A further examination of the IR spectra of the acid modified resin as shown in FIG. 1 shows that there is substantially no decrease in the absorbance at 1230 cm$^{-1}$ and 1060 cm$^{-1}$. This absorbance is attributed to the dibenzyl ether groups.

It is, therefore, concluded that the dibenzyl ether groups are not affected by acid addition at room temperature. In the light of the IR data presented in FIG. 1 and the foregoing discussion, it is evident that a new thermosetting phenol formaldehyde resin containing benzyl ether linkages ortho to the phenolic hydroxyl group, which exhibits substantially less absorption at 1010 cm$^{-1}$ in the IR spectrum as compared to the resin before acid addition, typically exhibiting, during the acid addition step, a decrease in ratio of absorbance at 1010 cm$^{-1}$ measured from a base line drawn between wave numbers of 1030 cm$^{-1}$ and 950 cm$^{-1}$, to that at 1230 cm$^{-1}$ measured from a base line drawn between wave numbers of 1130 cm$^{-1}$ and 1310 cm$^{-1}$ of at least 35%, preferably about 60 to about 95%. In the novel resin, the ratio is less than about 0.1, typically less than about 0.07. Thus, the new resin is chemically different from the high viscosity resin produced by using the procedure of Canadian Pat. No. 927,041.

The new resin prepared by this procedure, has a lower content of small molecular weight compounds and a somewhat higher average molecular weight. It is also chemically different, in that the benzyl hemi-formals have been replaced by methylol groups.

Figure 2A:
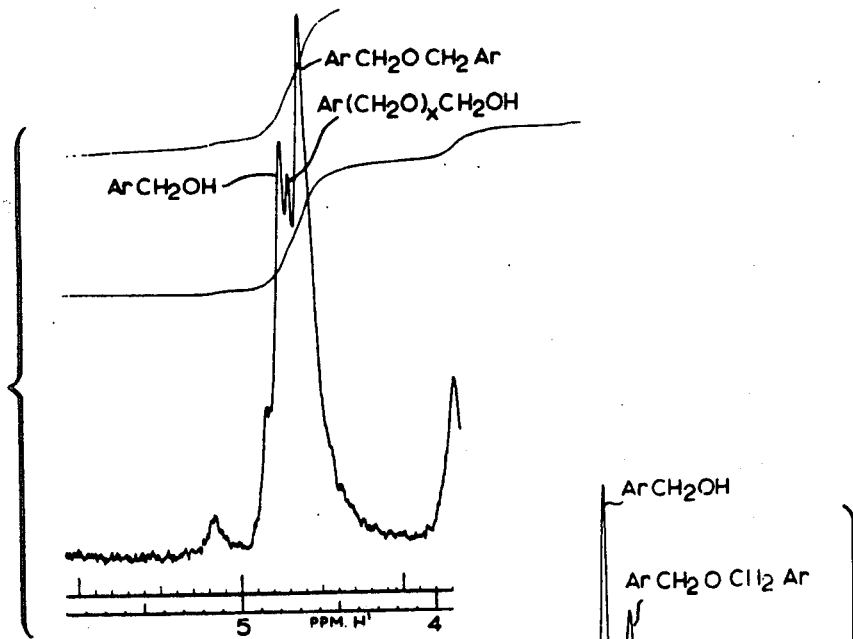
FIGS. 2A, 2B and 2C are nuclear magnetic spectra showing changes in absorption with time upon addition of acid to a phenol-formaldehyde resin containing predominantly benzyl ether linkages and prepared in accordance with the above-described modification of the procedure of Canadian Pat. No. 927,041.
Figure 2B:
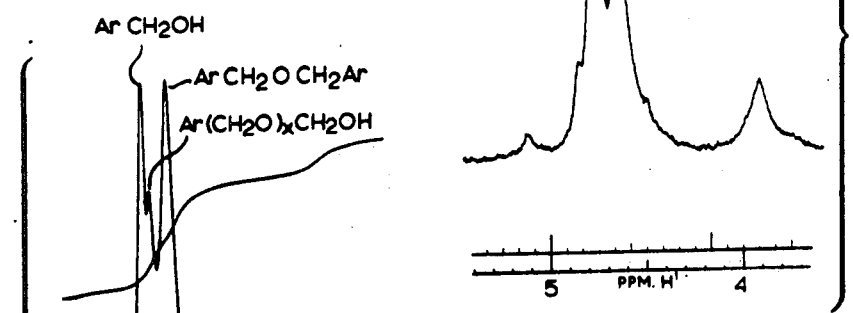
Figure 2C:
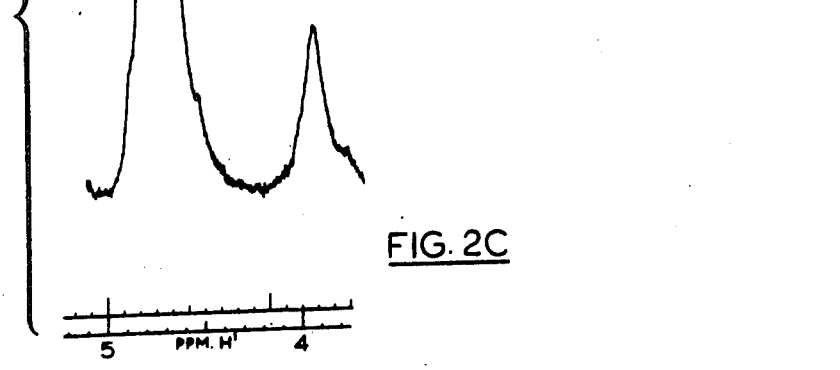
Figure 3A:
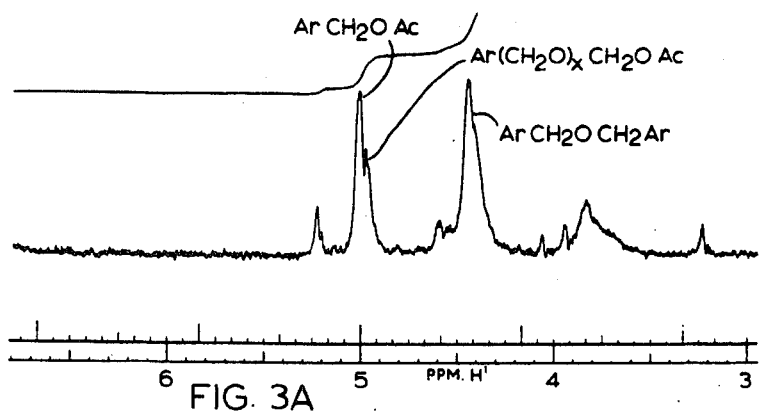
FIGS. 3A, 3B and 3C are nuclear magnetic spectra similar to FIGS. 2A, 2B and 2C with the exception that the resins are in an acetylated form.
Figure 3B:
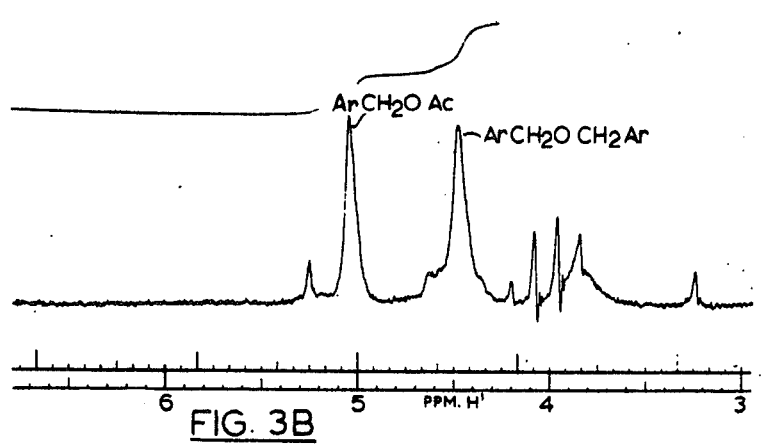
Figure 3C:
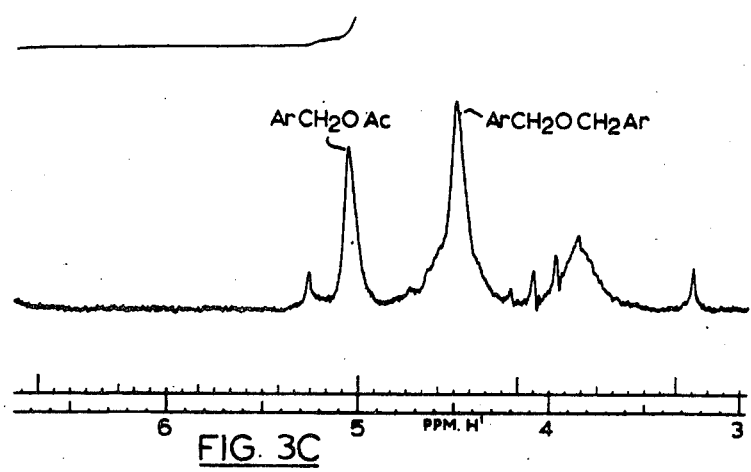

Additional evidence of the formation of a new phenol-formaldehyde resin on addition of controlled quantities of acid to high viscosity resins prepared by the procedure of the Canadian Pat. No. 927,041 is obtained by the use of Nuclear Magnetic Resonance Spectroscopy (NMR). FIGS. 2A, 2B and 2C show the NMR spectra of the high viscosity resin prepared according to the procedure of the Canadian Pat. No. 927,041 and the spectra of the same resin 45 minutes and 24 hours after addition of 1% by weight of the resin of toluene sulfonic acid as a 50% aqueous solution thereof, the reaction being carried out at a room temperature of about 70° F. Corresponding spectra of the acetylated resins are given in FIGS. 3A, 3B and 3C. The absorptions attributed to various chemical groups are shown on the spectra.

An examination of the spectra shown in FIGS. 2A, 2B and 2C and FIGS. 3A, 3B and 3C clearly shows that the addition of small quantities of acid at or around room temperature leads to the formation of a new resin that, in its chemical structure, is quite different from the resins prepared by the procedure of the Canadian Pat. No. 927,041.

The rate at which the novel resin of the invention is formed depends upon the amount of acid added, the strength of acid used and the temperature. Thus, when 1% toluene sulfonic acid as a 50% solution in water is added to a high viscosity resin made according to the Canadian Pat. No. 927,041 and the acidified resin is maintained at room temperature (approximately 70° F.) the decrease in the IR absorption band at 1010 cm$^{-1}$ is virtually complete in a matter of five minutes or less as shown by the IR spectra of FIG. 1. However, if half of this amount of acid is added, that is 0.5% of toluene sulfonic acid (as a 50% solution in water) and the mixture maintained at room temperature (approximately 70° F.), there is no detectable change in the IR absorption band at 1010 cm$^{-1}$ even after 2 hours. If, however, the temperature of this mixture is raised to about 140° F., a decrease in the IR absorption band at 1010 cm$^{-1}$ is detectable within 1 hour and is virtually complete within 6 hours.

When more than 1.5% toluene sulfonic acid (as a 50% solution in water) is added to the high viscosity resin (made according to the Canadian Pat. No. 927,041), the novel resin of the invention is formed almost instantly. However, the addition of such a large quantity of acid renders the novel resin quite unstable. Within 2 hours, the acidified resin gels. This is presumably due to the further condensation of the methylol groups.

It is preferred, therefore, for the production of a room-temperature stable product having a variety of end uses that, (1) the quantity of acid used to convert the high viscosity resin made according to the Canadian Pat. No. 927,041 to the novel resin, and (2) the corresponding temperature of conversion and (3) subsequent storage, be carefully controlled. When toluene sulfonic acid is used, between 0.25 and 1.5% of this acid is used, preferably about 0.5 to about 1.0% of acid. When the smaller quantities of this acid are used, correspondingly higher temperatures are needed to form the novel resin within a reasonable time. When acid amounts in excess of 1.5% are used, the acidified mixture must be neutralized as soon as the formation of the novel resin is complete, to prevent the novel resin from gelling due to subsequent cross-linking of methylol groups.

When acids other than toluene sulfonic acid are used, the quantity of acid required to form the novel resin may vary according to the inherent strength of the acid. Thus, when phosphoric acid is used 1 to 3% acid may be used to form the novel resin intermediate.

In some end uses of the novel resin of the invention, the acid addition may be delayed until after the initial resin has been applied due to the difficulties mentioned above in applying acid catalyzed resins at elevated temperatures to substrates. For example, in the production of composite boards from rice husks or wood chips, a high viscosity thermosetting phenol-formaldehyde resin provided in accordance with the procedure of Canadian Pat. No. 927,041 may be sprayed at an elevated temperature, or otherwise applied to the rice husks or wood chips, separately, and thereafter the required amount of acid is sprayed or otherwise applied. The materials may be applied in the reverse order, if desired. If such a case, the required amount of the novel resin is formed on the particles. If the quantity of acid added is not in excess of that required to form the novel resin, the coated particles may be stored for a prolonged period of several weeks. However, at any time the coated particles may be formed into a composite structure by the appropriate application of heat and pressure, with the addition of catalyzing quantities of acid, if desired.

The quantity of acid discussed above for formation of the novel resin is the quantity of acid actually contacting the resin. Thus, for example, this is the case when the acid or its solution is stirred directly into the initial resin. However, in such applications as the production of composite boards from rice husks or wood chips if the resin and the acid or acid solution are sprayed separately, not all the acid may contact the resin. This is also the case when, for example, the initial resin is used as an aqueous emulsion, and the acid is added to the emulsion. In such a case the majority of the acid remains in the aqueous phase and only a small percentage thereof actually contacts the resin. In such cases the minimum quantity of the acid required to form the new resin has to be specifically determined by utilizing the IR spectral band at 1010 cm$^{-1}$ and NMR-spectroscopy. The upper limit of the acid that can be used is more easily determined for, if the actual quantity of acid in the resin phase is too high, the novel resin is unstable, resulting in cross-linking and gelling within an hour or so of acid addition.

Another use for the new resin of the invention is in the manufacture of plywood or other lamina products containing at least one wood lamina or wood-paper composite products. Phenolic resins currently used in the manufacture of plywood are caustic aqueous solutions of phenol-formaldehyde resins. These resins perform as suitable adhesives only when water is present. In the absence of water, the sodium salt of the phenolic polymer has no flow even under heat and pressure. In the manufacture of plywood, immediately after adhesive application, water loss occurs both through soaking into plywood and by evaporation into the air. Consequently, the hot pressing of the plywood has to be completed very soon after the adhesive has been applied to individual pieces of veneer. This severe limitation in the use of thermosetting phenol-formaldehyde resins for plywood adhesive may be readily overcome by using the new resin of the present invention, which has a very long shelf life and good performance characteristics even in the absence of water.

An important aspect of the first embodiment of the present invention is the control of tack in phenol-formaldehyde resins which contain benzyl ether linkages ortho to the phenolic hydroxyl group.

In most adhesive applications, whether natural adhesives, such as proteins and starches, or thermoplastic synthetic resins, such as polyvinyl acetate or neoprene-phenolic resin contact cements, or thermosetting synthetic resins, such as melamine formaldehyde, urea formaldehyde and phenol formaldehyde resins, are used, a very important requirement is the ability to control tack. In many applications, such as, shell molding sands and certain types of fiber and composite board operations, the presence of tack is very undesirable. On the other hand, in packaging and caulless particle board manufacture, tack is very desirable or even necessary. Therefore, the ability to control tack, so as to be able to use a thermosetting resin in a variety of applications is important.

The high viscosity thermosetting phenol-formaldehyde resins made according to the procedure of Canadian Pat. No. 927,041 at the mole ratio of formaldehyde to phenol of 1.5:1 exemplified therein normally are very tacky. The preparative procedure results in the presence of about 5 to 10% of free phenol in the resin and, since phenol is a good solvent for this resin, its presence tends to depress the melting point (otherwise known as the "glass transition temperature") of the resins, thereby rendering them tacky at room temperature.

It is mentioned above that the conversion of the resin of Canadian Pat. No. 927,041 to the novel resin of the present invention leads to the loss of hemi-formal groups and a decrease or disappearance of free phenol in the mixture. Because of the combined effect of these two chemical changes, the novel resin of the invention is substantially tack free. Since, however, the lack of tack in the novel resin is due to the absence of a solvent, such as phenol, the tack may be regenerated at will by the addition of small quantities of a suitable solvent, such as phenol or benzyl alcohol.

The tack may be restored to the novel resin of this embodiment of the invention by heating the resin to a temperature above its glass transition temperature but below its cure temperature. Typically, this temperature may lie in the range of about 100° to 300° F., the degree of tack increasing with temperature. The tack of the novel resin, therefore, may be controlled by the use of solvent or elevated temperatures, or a combination of the two. It is less preferred to control tack by the use of temperature when it is proposed to store the tacky resin, since at elevated temperatures, the novel resin is less stable than at normal room temperatures around 70° F.

The tack-free novel phenol-formaldehyde resin of this embodiment of the present invention is stable over long periods of time when stored at temperatures below those above which curing occurs, and hence are usable in various adhesive applications even after prolonged storage. The novel resins, however, cure rapidly on heating to elevated temperatures, especially in the presence of additional quantities of acid curing catalyst.

Figure 4:
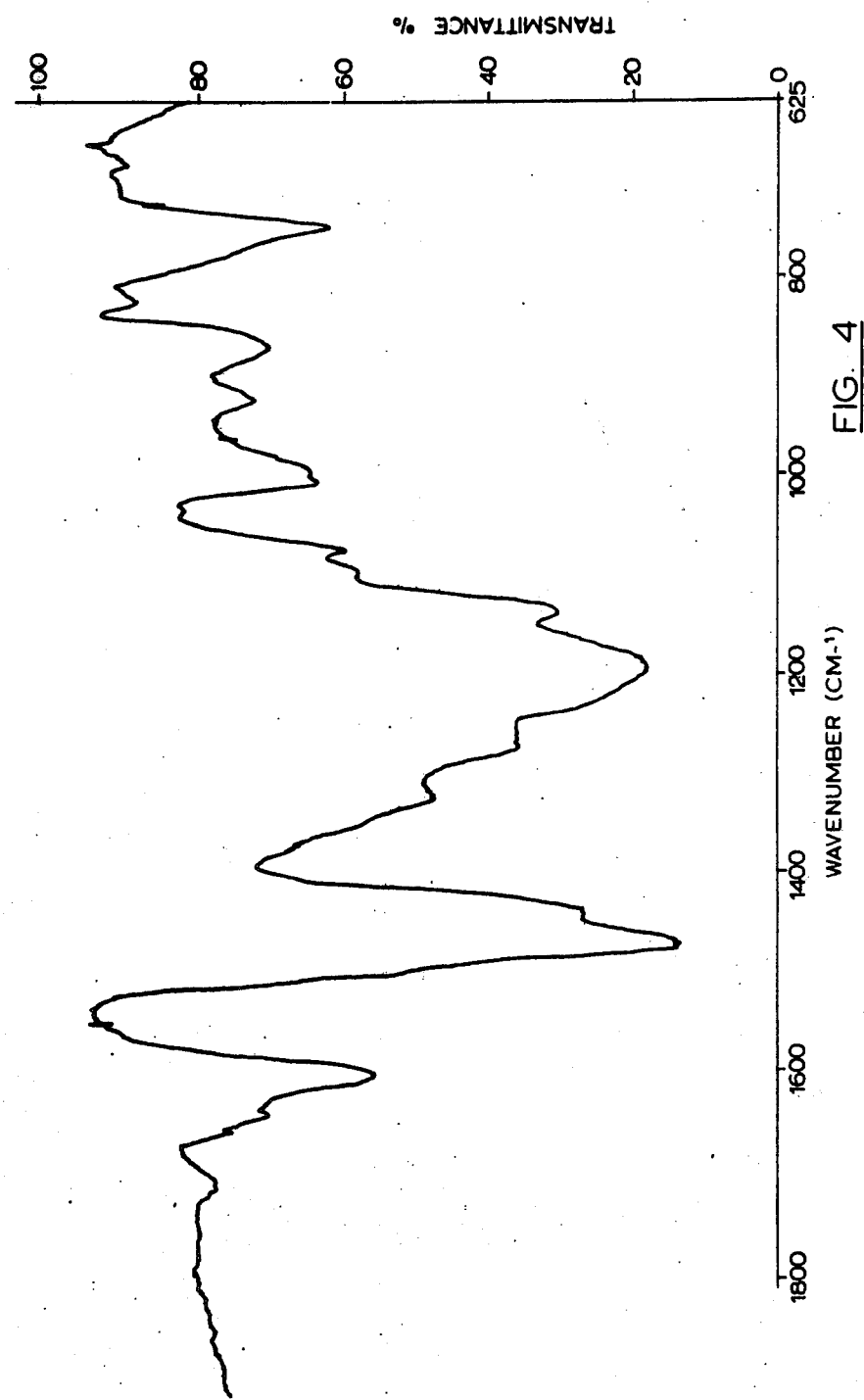
FIG. 4 shows an infra-red spectrum of a fully cured resin formed from acid-added resins.

The production of the novel resin of the invention by the procedure described above represents a totally different reaction from that leading to its cure on subsequent application of heat. On the application of heat, the dibenzyl ether linkages break or rearrange to form methylene linkages. This may be seen from the IR spectrum shown in FIG. 4 of the cured resin produced by curing at 390° for 5 minutes, where the dibenzyl ether absorption band at 1060 cm$^{-1}$ previously present has completely disappeared. The IR spectrum of FIG. 4 also shows the appearance of substitution at the para position, indicated by increased absorbance at 870 cm$^{-1}$ and decreased absorbance at 740 cm$^{-1}$ providing additional evidence of cross-linking.

The conversion of the high viscosity resins made according to the procedure of Canadian Pat. No. 927,041 into a novel resin in accordance with the present invention gives rise to many advantages in industrial usage that are not obtainable with the original resin. The acid catalyst may for example, be applied at the same time as the resin in certain applications without undue loss of storage stability and with the added advantage of fast cure rates on application of heat. This provides considerable flexibility in industrial operations, a flexibility that is presently not available with low cost, one component thermosetting resins. Additionally, the tack of the initial resin may be controlled at will from no tack to a tacky system, by controlling the proportion of the novel resin intermediate which is formed, or by controlling the proportion of free solvent which is present.

As mentioned previously, the high viscosity resins need to be heated for many adhesive applications, leading to the necessity to apply the resin and acid curing catalyst separately to the substrate.

EXAMPLES

Example 1

This example illustrates the preparation of a phenol-formaldehyde resin an accordance with the first embodiment of the invention.

A resin was prepared following the two-step procedure of Example 1 of Canadian Pat. No. 927,041 using a mole ratio of formaldehyde to phenol of about 1.6:1 and then prolonging the second step to provide a high viscosity resin. An infra-red absorption spectrum for this resin was obtained. Toluene sulfonic acid, 0.5% based upon the resin weight using a 50% solution in water, was then added to the resin, and the infra-red absorption spectra obtained at various times after the acid addition were obtained.

The absorbance values at wave numbers 1010 cm$^{-1}$ (using a base line drawn between 950 cm$^{-1}$ and 1030 cm$^{-1}$) and at 1230 cm$^{-1}$ (using a base line drawn between 1130 cm$^{-1}$ and 1310 cm$^{-1}$) were calculated. The results obtained are set forth in Table I below:

TABLE I

| HCHO to Phenol mole ratio used | Absorbance Ratio 1010 cm$^{-1}$/1230 cm$^{-1}$ | | Time After Acid Addition (mins) | % Decrease |
|---|---|---|---|---|
| | Before Acid Addition | After Acid Addition* | | |
| 1.6 | 0.19 | 0.04 | 5 | 79 |
| | | 0.07 | 135 | 63 |

*Because of very small residual absorption at 1010 cm$^{-1}$ after acid addition, these determinations can only be of an order of magnitude and have an inherent limit of accuracy.

The resin after acid addition was placed on a hot plate at 350° F. The resin melted and soon thereafter set to an infusible brittle mass.

Example 2

This example illustrates the control of tack when the resin provided by the procedure of Example 1 is used as a binder on non-porous substrates such as sands used in shell molding in foundry practice.

A resin was made according to the two-step procedure outlined in Canadian Pat. No. 927,041. This resin was used to coat foundry sand and the quantity of resin used was 3% by weight of sand. Two product samples were prepared as follows:

(a) A resin with a viscosity of over 60 Kreb units at 120° F. and having a resin solids content of 82% was coated on warm sand having a temperature of about 120° F. by rubbing. The sand was cooled and stored at room temperature.

(b) A resin with a viscosity of over 60 Kreb units at 120° F. and having a resin solids content of 82% first was modified by the addition of 0.5% toluene sulfonic acid (as a 50% solution in water) in accordance with the first embodiment of the invention and then coated on warm sand having a temperature of about 120° F. by rubbing. The sand was cooled and stored at room temperature.

(c) A resin with a viscosity of over 60 Kreb units and having a resin solid content of 82% first was modified by the addition of 4% toluene sulfonic acid (added as a 50% aqueous solution thereof) and then coated on warm sand having a temperature of about 120° F. by rubbing. The sand was cooled and stored at room temperature.

The samples (a), (b) and (c) were periodically examined. At the end of 24 hours the sample (a) was still tacky, whereas samples (b) and (c) were quite dry and free-flowing.

After 24 hours storage, all three samples of coated sand, samples (a), (b) and (c), were used to form standard foundry dog bones by air blowing into the hot mold. Sample (a) gave a dog bone that had very poor strength characteristics, while sample (b) gave very acceptable specimens. On examination, it was found that sample (a) did not fill the mold completely, presumably because the sand was tacky and not free-flowing, in contrast to sample (b), which was free-flowing.

Sample (c) failed to bind at all, although the individual sand particles changed to a dark brown color showing precure of resin in the presence of the large quantity of acid.

Example 3

This example illustrates the use of the novel resin of the first embodiment of the present invention in composite board manufacture.

A resin having a viscosity of over 100 Kreb units at 120° F. was prepared using the two-step procedure of Canadian Pat. No. 927,041 at a mole ratio of formaldehyde to phenol of 1.6 to 1. Three product samples were prepared utilizing this resin, as follows:

(a) The resin was coated on rice husks in a quantity of 10% by weight of husk.

(b) The resin, after addition of 3% by weight of toluene sulfonic acid thereto, (as a 50% aqueous solution thereof), was coated on rice husk in a quantity of 10% by weight of husk.

(c) The resin, after addition of 0.5% by weight of toluene sulfonic acid thereto (as a 50% aqueous solution thereof), was coated on rice husk in a quantity of 10% by weight of husk.

Samples (a), (b) and (c) were examined periodically. It was found that all three samples were quite tacky when freshly coated. Sample (a) became tack-free after 24 hours due to absorption of the free phenol by the rice husks, sample (b) became tack-free after 2 hours and sample (c) became tack-free after 6 hours.

The tack on samples (a) and (c) could be regenerated by addition of 1% phenol (based upon husk weight) or benzyl alcohol.

It is concluded, therefore, that the disappearance of tack is due to the loss of the low molecular weight components, which in turn raises its melting point. In the case of sample (a), the loss of molecular weight components occurs by absorption into the porous husks, whereas in the case of samples (b) and (c) the loss of the low molecular weight components occurs both by absorption and chemical reaction. It was also found in the case of samples (a) and (c), the tack may be partially restored by warming the resin coated husk to slightly above the ambient temperature.

After 24 hours, the coated husk from all three samples was formed into individual mats and hot pressed for 8, 10, 12, 14 and 16 minutes each. Boards, ⅝ inches thick and 50 lbs/ft³ in density were made using a press temperature of 390° F.

Sample (a) required 16 minutes to form a good board. Sample (b) did not give a good board under any of the conditions used. Sample (c) gave a good board at 10 minutes press time.

The experiment was repeated with sample (b), except that this time the boards were hot pressed immediately after coating the resin onto the husk. A good board was made at 10 minutes press time.

The above examples 1 to 3 illustrate how, under different application conditions, acid addition, resin viscosity and substrate characteristics can be judiciously combined to control tack and other performance characteristics. The discovery of the fact in accordance with the first embodiment of the invention, that the resin made according to the procedure disclosed in Canadian Pat. No. 927,041 does not cure on the addition of small quantity of acids at room temperature, but simply changes to another new form, still retaining the thermosetting character, cannot only be used to reduce tack by acid addition, as in the case of shell molding, but also enables one to introduce tack by the addition of phenol or solvents, as in the case of wood chips and rice husks.

It should be emphasized that the invention claimed should not be considered to be restricted in use to controlling tack in shell molding and in composite boards. These examples, are merely illustrations to describe the scope of the invention on both porous and non-porous substrates, where control of tack along with other desirable characteristics such as storage stability and fast cure is required.

SUMMARY

The present invention, therefore, provides novel phenol-formaldehyde thermosetting resins having distinctive infra-red spectra and which are rapidly curable to a thermoset stage. Certain of the resins have superior adhesive properties in many applications. Modifications are possible within the scope of the invention.

What we claim is:

1. A method of forming a rigid shaped article, which comprises:

reacting phenol with formaldehyde in an aqueous reaction medium in the presence of a metal carboxylate catalyst therefor to form a thermosetting phenol-formaldehyde resin having benzyl ether linkages and hemiformal groups ortho to the phenolic hydroxyl groups and an infra-red spectrum which displays large absorption at wave numbers of approximately 1230 cm$^{-1}$, 1060 cm$^{-1}$ and 1010 cm$^{-1}$, contacting said resin with at least one strong acid to cause a decrease of at least 35% in the ratio of absorbance at 1010 cm$^{-1}$, measured from a base line drawn between the wave numbers of 1030 cm$^{-1}$ and 950 cm$^{-1}$, to that at 1230 cm$^{-1}$, measured from a base line drawn between wave numbers of 1130 cm$^{-1}$ and 1310 cm$^{-1}$, to a value less than about 0.1, while leaving substantially unaffected the absorption at wave numbers of 1230 cm$^{-1}$ and 1060 cm$^{-1}$, providing the resin resulting from said contacting with acid as a coating over at least part of the surface of each member of a plurality of individual elements, forming said coated plurality of elements into a shape, and thermosetting the resin of said coating to provide said rigid shape article.

2. The method of claim 1 wherein said resin is applied to the surface of each member of said plurality of individual elements and said reaction with acid is carried out in contact with said surface to provide said coating thereon.

3. The method of claim 1 wherein said coated plurality of elements is in the form of a free-flowing mass, and including contacting said free-flowing mass with a solvent for the resin of said coating to provide a tacky mass of elements, and wherein said coated elements are formed into said shape by molding said tacky mass into said shape.

4. The method of claim 1 wherein said coated plurality of elements is in the form of a free-flowing mass, and including heating said mass to a temperature above the glass transition temperature of said coating but below the curing temperature thereof to provide a tacky mass, and wherein said coated elements are formed into said shape by molding said tacky mass into said shape.

5. The method of claim 1 wherein said coated plurality of elements is in the form of a plurality of laminated elements.

6. The method of claim 1 wherein said thermosetting of said resin of said coating is achieved by heating the resin to a temperature above the thermosetting temperature thereof in the presence of at least one strong acid catalyst for said thermosetting.

7. The method of claim 1 wherein said individual elements are rice husks.

8. The method of claim 1 wherein said individual elements are grains of foundry sand.

9. The method of claim 1 wherein said individual elements are wood chips.

10. The method of claim 1 wherein said individual elements are wheat straw.

11. The method of claim 1 wherein said individual elements are rye grass.

12. The method of claim 1 wherein said individual elements are paper lamina.

* * * * *